R. N. SAUNDERS.
MILKING MACHINE.
APPLICATION FILED APR. 15, 1916.
1,307,929.
Patented June 24, 1919.
2 SHEETS—SHEET 2.
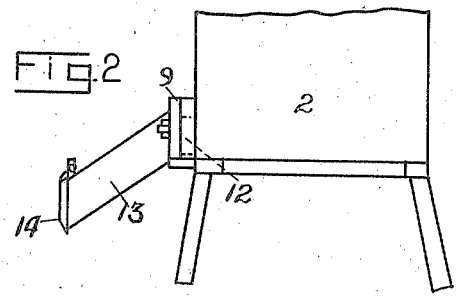
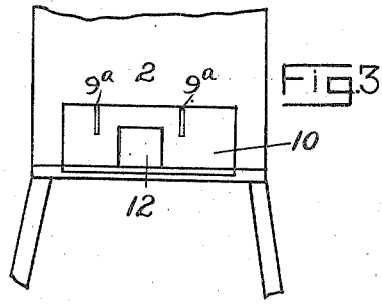
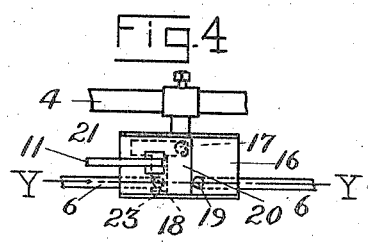
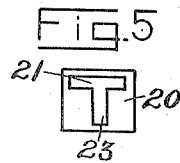
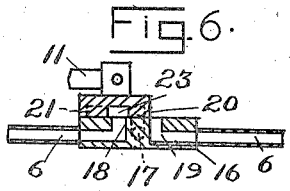
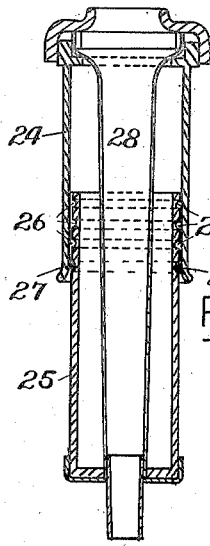
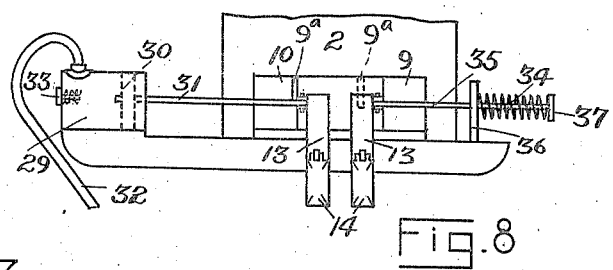
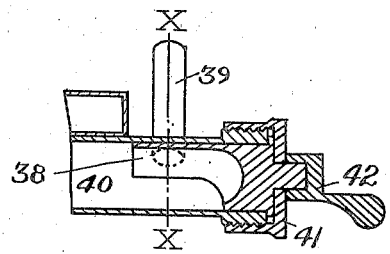
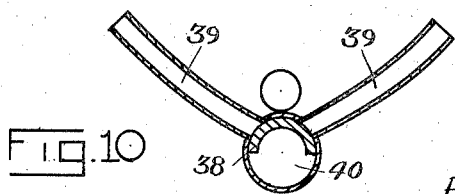
Richard Northey Saunders
Inventor
by Laurence Langner
Attorney

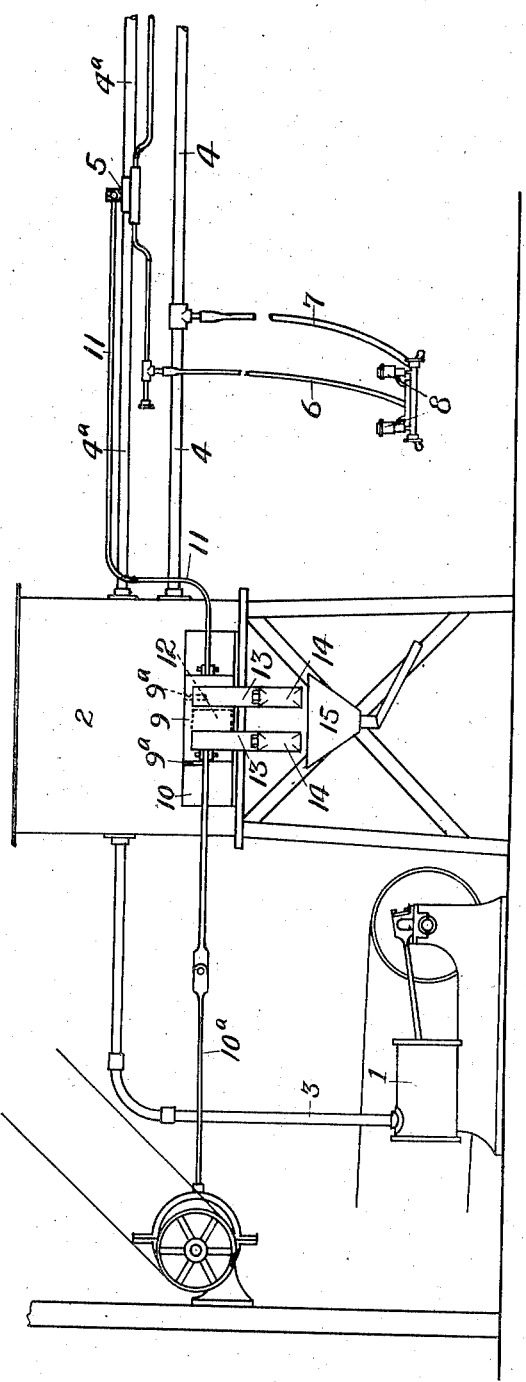

UNITED STATES PATENT OFFICE.

RICHARD NORTHEY SAUNDERS, OF AUCKLAND, NEW ZEALAND.

MILKING-MACHINE.

1,307,929.       Specification of Letters Patent.     Patented June 24, 1919.

Application filed April 15, 1916. Serial No. 91,466.

*To all whom it may concern:*

Be it known that I, RICHARD NORTHEY SAUNDERS, a subject of His Majesty the King of the United Kingdom of Great Britain and Ireland, resident of the city of Auckland, in the Provincial District of Auckland and Dominion of New Zealand, have invented new and useful Improvements in Milking-Machines, of which the following is a specification.

The improvements projected herein relate to the machinery or apparatus employed in mechanical milking, and more particularly to certain parts thereof, such as, the releasing means, the pulsator, the teat cups and the teat cups claws.

By this invention means are provided whereby the rubbers or rubber inflation in the teat cups may be readily tightened, thus enabling a serious defect in milking plants to be easily overcome, also the teat cups are enabled to be cut off from the milk and vacuum pipe by the provision of taps in the ends of the claws. The pulsator and the releasing means are both operated by the same operating means, and each is adapted to perform its function with a minimum of movement.

The several improvements will be more readily understood on reference to the accompanying drawings, in which, Figure 1 shows in elevation the general arrangement of the parts referred to, Fig. 2 is a side view of portion of the milk collecting receptacle or receiver showing means for releasing the milk therefrom, Fig. 3 is a front view of portion of the milk collecting vessel or receiver showing valve face and port, the valve itself being removed.

Fig. 4 is a plan view of the form of pulsator used,

Fig. 5 is an underneath view or bottom plan of the upper sliding or valve portion of the pulsator, Fig. 6 is a sectional view of the pulsator taken through Y—Y Fig. 4, Fig. 7 is a sectional elevation of the improved teat cup, showing telescopic casing, Fig. 8 shows in elevation an alternative means for operating the milk releasing valve, Fig. 9 is a longitudinal sectional elevation of one end of a teat cup claw showing tap therein, and Fig. 10 is a cross sectional elevation of a teat cup claw taken through X—X, Fig. 9.

In the drawings, 1 represents the vacuum pump driven from any convenient source of power in the usual way, 2 the milk receiver, 3 pipe connecting milk receiver with vacuum pump, 4 the main milk pipe, $4^a$ the vacuum pipe, 5 the pulsator, 6 the pulsator connections to teat cups, 7 the milk connections to teat cups, 8 the teat cups, 9 milk releasing valve, $10^a$ eccentric and rod for operating same, and 11 push rod for reciprocating valve of pulsator.

The vacuum pump 1 is of usual construction and draws the milk from the teat cups 8 by means of the milk and vacuum pipes 4 and $4^a$ and connections into the milk receiver 2, from which it is released by the action of the valve 9. The valve face 10 against which the valve 9 works is provided with a port 12 therein, and the valve 9 with two inclined milk chambers 13, each having an automatic flap valve 14 at its outer or lower end. The chambers 13 are situated in the valve 9, a distance apart sufficient to allow only one chamber at a time to be open to the port 12, the other chamber being meanwhile cut off therefrom, and as the valve 9 reciprocates across the valve face 10, the chambers 13 are alternately filled with milk from the receiver 2 through the port 12, the milk being discharged from the chambers 13 during the period they are closed or cut off from the port 12, or over one of the air slots $9^a$ in the face 10 and consequently out of communication with the vacuum of the plant which latter position permits the milk by its own weight to force open the flap valve at the lower end of the chamber and to escape into a chute 15, or its equivalent placed directly beneath.

The pulsator (Figs. 4, 5 and 6) consists of a lower portion 16 having three vertical passages 17, 18 and 19 therein, passage 17 being connected with the main vacuum pipe $4^a$ and passages 18 and 19, independently of each other with the pulsator pipes 6 to the teat cups 8. The valve or upper sliding portion 20 has a T shaped recess or hollow formed in its underneath surface, the portion 21 of which is always over or in communication with the vertical passage 17 connected with the vacuum pipe $4^a$. The valve 20 is worked backward and forward or reciprocated on the lower portion 16 by the push rod 11 connected to the valve 9, so as to cause the leg 23 of the T shaped recess or hollow to come over the passages 18 and 19, and connect them one at a time with the passage 17 and allow the vacuum to act in the pulsator pipes 6. While either of the passages 18 or 19 is connected with the passage 17, the other is by reason of the position of the valve 20 uncovered or open to the atmosphere (Fig. 4) and this alternate and separate connecting of the passages 18 and 19 with the passage 17, and the opening of the former to the atmosphere produces the necessary pulsations which are conveyed by the tubes or pipes 6 to the space between the teat cup rubbers and casings.

The improved teat cup as illustrated in Fig. 7, is formed with its casing in two sections, an upper section 24, and a lower section 25 made to telescope or slide therein. Around the upper end of the lower section 25 is provided a series of grooves 26 in one of which a rubber ring 27 engages so as to keep the teat cup casing extended, and also to insure an air tight joint being made between the two sections 24 and 25. The rubber inflation or tubing 28 is secured in the casing in the usual way, and to tighten same it is only necessary to extend the casing and force the rubber ring into whichever of the grooves 26 is most suitable for maintaining the extension. By these means the inflation is enabled to be kept tight or in a constant state of tension.

In Fig. 8, an alternative means for imparting a reciprocating motion to the milk releasing valve 9 is shown. These means consist of a cylinder 29 with a piston 30 working therein, the piston rod 31 being connected to the valve 9. Vacuum from a suitably placed pulsator or any other convenient source of similar power is caused to act in the back end of the cylinder 29 through the pipe 32, with the result that the piston 30 is drawn toward the back end of the cylinder and imparts movement in one direction to the valve 9. The piston 30 on nearing the end of its stroke strikes, and causes to open an inlet valve 33 in the cylinder end, causing the vacuum within the cylinder to be destroyed which allows the piston and valve to be moved in the reverse direction or returned to their original positions by the coiled spring 34, on the rod 35 connected to the opposite end of the valve 9, and which is compressed between the stationary guide 36 and stop 37 on the rod 35 on the first or forward movement of the piston and valve.

In the claw end shown in Figs. 9 and 10 a tap 38 the sides of the plug of which are parallel is provided for cutting off the milk connections 39 at that end from the main chamber or body 40 of the claw. The tap 38 is half cut away for part of its length and is kept in position by the screwed cap 41 through which projects a short spindle carrying a wing nut 42. When the tap 38 is in the position shown in Figs. 9 and 10 both of the milk connections 39 at that end are cut off from the claw milk and vacuum chamber 40, and when the tap is given a half turn, or when its forward end is down instead of up, communication with the teat cups through the milk and vacuum connections is permitted.

Having now fully described my invention, what I desire to claim and secure by Letters Patent is:—

1. In machine milking apparatus, means for releasing the milk from the vacuum of the plant, comprising, a milk receiver; a vertical valve face with a single port therein, and a slot on each side of said port, secured to the side of said milk receiver at the bottom thereof; a vertical valve working on said valve face; two inclined milk chambers mounted on said valve, and adapted to be placed separately in communication with the port in the valve face.

2. In machine milking apparatus, the combination with a vacuum plant of a milk receiver connected thereto, a vertical valve face provided with a port, and an air slot on each side of the latter, a milk releasing valve, two inclined milk chambers thereon provided at their lower ends with automatic flaps, and means for actuating the milk releasing valve to cause each chamber to alternately fill from the port in the valve face, and to alternately discharge its contents on the opening of its outer flap valve, when the said chamber is opened to the atmosphere.

3. In machine milking apparatus, a teat cup, consisting of a casing comprising two telescoping portions, the outside periphery of the inner portion being provided with a series of grooves which are adapted to receive a rubber ring for the purpose of keeping the casing extended.

4. In machine milking apparatus, a teat cup claw fitted at both ends with an arcuate tap, the sides of the plug of which are parallel, and adapted to control the flow of the milk through the claw.

RICHARD NORTHEY SAUNDERS.

Witnesses:
GEORGE WILLIAM BASLEY,
MARY CHRISTINA BRENNAN.